C. DÉ KANDO.
VEHICLE.
APPLICATION FILED JUNE 4, 1908.

917,309.

Patented Apr. 6, 1909.
3 SHEETS—SHEET 1.

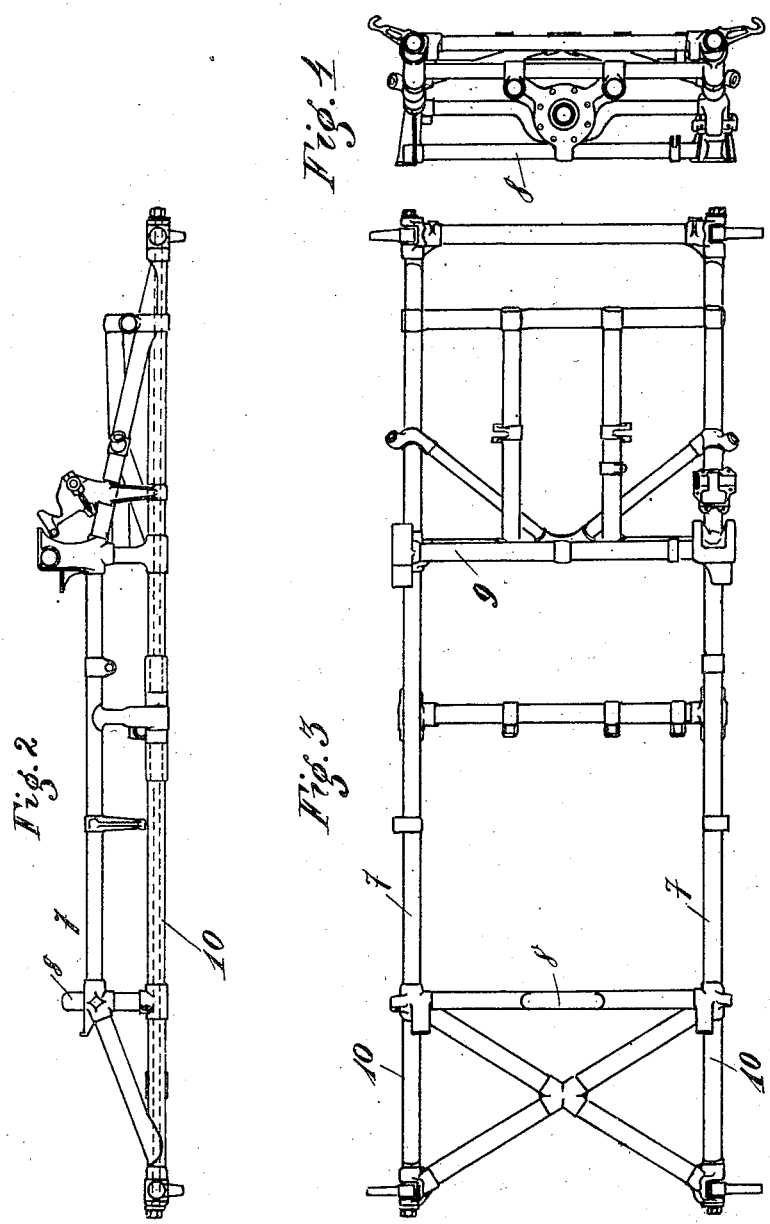

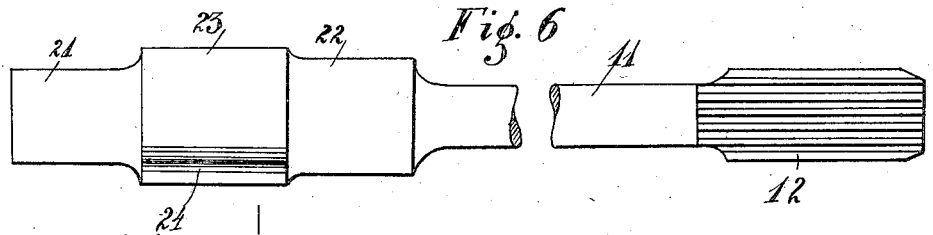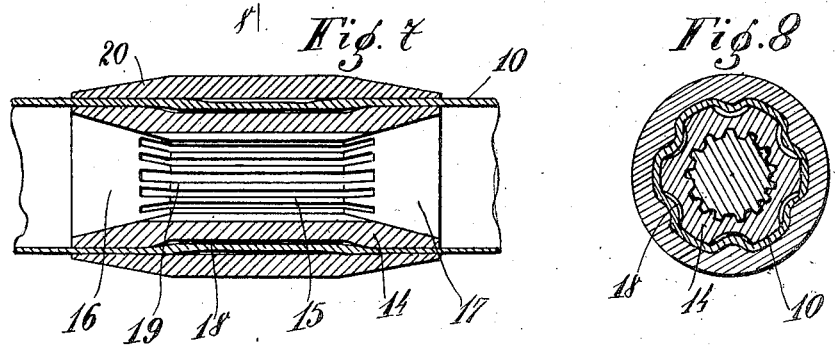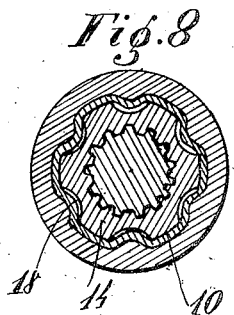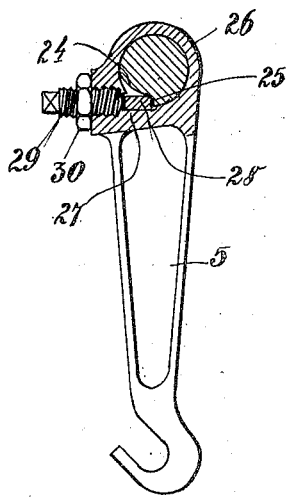

UNITED STATES PATENT OFFICE.

COLOMAN DE KANDO, OF BUDAPEST, AUSTRIA-HUNGARY.

VEHICLE.

No. 917,309.　　　Specification of Letters Patent.　　Patented April 6, 1909.

Application filed June 4, 1906. Serial No. 320,160.

*To all whom it may concern:*

Be it known that I, COLOMAN DE KANDO, engineer, a subject of the King of Hungary, residing at Budapest, Austria-Hungary, have invented certain new and useful Improvements in Vehicles; and I do hereby declare the following to be a full, clear, and exact description of the invention, such as will enable others skilled in the art to which it appertains to make and use the same.

My invention relates to a vehicle frame and more particularly to means for supporting automobile and other vehicle frames on their axles, so as to render same by means of an effective spring support as light and resilient as possible.

The vehicle frame is composed according to my invention of a framework of steel-tubes comprising two steel-tubes arranged in the longitudinal direction of the carriage. Within the hollow space of these longitudinal tubes and secured to the central part thereof are arranged torsion-spring-bars the free ends of which are rotatably supported in bearings provided at the open ends of the tubes. Said spring-bars are provided on their free ends with swinging arms or hooks by means of which the whole frame is suspended on the carriage axles by means of flexible or other intermediate members.

My invention relates further to special means for fastening the inner ends of the spring-bars to the central part of the longitudinal frame tubes and to means for adjusting the swinging arms on said spring-bars.

The invention is described with reference to the annexed drawings, in which—

Figure 1:
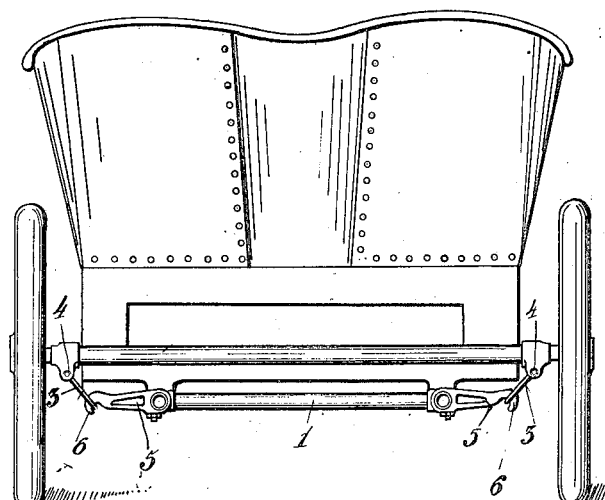
Figure 5:
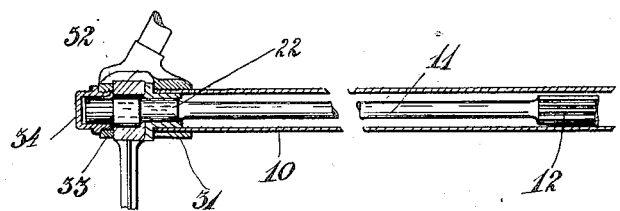

Figure 1 is a rear view of a carriage according to my invention; Fig. 2 is a side elevation of a modified form of the lower vehicle frame; Fig. 3 is a plan view of the frame shown in Fig. 2 and Fig. 4 is a front elevation of it. Fig. 5 is a sectional elevation of a longitudinal frame tube with the spring bar therein; Fig. 6 is the spring bar on larger scale; Fig. 7 is the sleeve and the adjacent parts for fixing the spring rods in the longitudinal frame tube; Fig. 8 is a cross section on the line 8—8 of Fig. 7 but with the spring rod fitted in; Fig. 9 shows the adjusting device for the swinging arm on the spring bar.

Referring to Fig. 1, 1 is the lower vehicle frame, 2 is the rear axle, 3, 3 are links pivoted at 4 and 5, 5 are swinging arms fixed on spring bars as will be described more fully hereinafter. The free ends of the swinging arms 5 are formed with hooks 6 engaging in the links 3, 3.

The vehicle frame shown in Figs. 2–4 comprises an upper frame 7, 8, 9 and a lower frame. This latter comprises two longitudinal tubes 10, 10 which are united by means of a plurality of cross-tubes to a rigid framework with the upper frame, as shown in the drawing. Within the longitudinal tubes 10, 10 are located spring bars as shown in dotted lines in Fig. 2 and in the sectional view Fig. 5.

The inner ends 12 of the spring bars are fastened in any suitable manner to the longitudinal tubes 10 at the central part of the tubes viz. at 13 in Fig. 2.

A very simple and efficient manner for fastening the spring rods to the tubes and especially on thin walled tubes, is shown in Figs. 6 to 8.

In Fig. 7 the center part of the tube 10 is shown. In this tube there is fitted a sleeve 14; this sleeve 14 has a cylindrical bore 15 which is conically enlarged on both ends at 16 and 17. The periphery of the sleeve is provided on the outer surface with longitudinal grooves 18, wherein the wall of the tube 10 is driven, in a way to secure the sleeve 14 within the tube. To protect this part of the tube and to render it more rigid a collar 20 is slid on the tube 10 covering the corrugated part. The inner surface of the sleeve 14 is provided with teeth 19, formed by a number of longitudinal grooves.

The inner end 12 of the spring bar is provided with similar teeth like a pinion and is adapted to fit closely into the toothed bore of the sleeve 14, whereby when the spring rod is fitted in the sleeve 14, it is secured firmly against any turning caused by the torque acting on the spring rod.

The outer free end of the spring rod is provided with two smooth surfaces or collars 21, 22 and an intermediate collar 23 of larger diameter. These collars serve for the journaling of the free end of the spring rods respectively in boxes provided at the mouth of tubes 10. The collar 23 serves for securing the swinging arm 5. The collar 23 is for this purpose provided with a groove 24 (Fig. 6 and 9) with a radial face 25. The bore of the hub 26 of the swinging arm 5 has a rectangular recess 27 so that a key 28 may be placed between the radial face 25 of the groove 24 and the recess 27. The hub of the swinging arm is provided with a tangential screw threaded bore with a screw bolt 29 and a jam-nut 30.

When the spring bar is fitted with the swinging arm 5 in the manner shown in Fig. 9 and the brass 31 (Fig. 5) is placed on the neck 22, the head 12 of the spring rod will be fitted in the approximate correct position into the sleeve 14 of the longitudinal tube 10, whereby the brass 31 fits in the mouth of the tube 10.

The end of the tube 10 is soldered to the joint piece 32, the arm 33 of which is provided with a screw-threaded bore and a cap 34 screwed therein. The cap 34 fits on the trunnion 21 of the spring rod.

When the carriage is suspended by means of the swinging arms 5 on the axles and it is observed that the swing arms are not in the position required, they may be adjusted by means of the set screws 29 by the turning of which the angular position of the swinging arm 5 on the spring rod is altered.

Having now described my invention, what I claim is:

1. In a vehicle, a frame comprising a skeleton structure, a torsion spring member arranged axially of certain of the skeleton elements and secured at one portion thereto, and an eccentric connection between the free end of the torsion member and the vehicle axle.

2. In a vehicle, a frame comprising a tubular skeleton structure, a torsion spring member arranged within certain of the skeleton elements and secured at one portion thereto, and an eccentric connection between the free end of the torsion member and the axle.

3. In a vehicle, a frame comprising a tubular skeleton structure with two longitudinal elements, torsion spring rods arranged within the longitudinal tubes, a fixed connection between one end of the rods and the tubes, and an eccentric connection between the free ends of the rods and the axle.

4. A vehicle frame composed of steel tubes, comprising two longitudinal tubes, spring rods arranged within said tubes, means to fix the inner ends of the spring rods, swinging arms on the free ends of the spring rods and links connecting said swinging arms with the vehicle axles.

5. In a vehicle, a frame comprising a tubular skeleton structure with two longitudinal elements, torsion spring rods arranged within the longitudinal tubes, an unround telescopic connection between the inner ends of the rods and the tubes, arms on the free ends of the rods, and links connecting said arms with the axles.

6. In a vehicle, a frame comprising a tubular skeleton structure with two longitudinal elements, a sleeve having an unround central bore and fixed within the longitudinal tubes, torsion rods having unround ends arranged within the sleeves in the tubes, arms on the free ends of the rods and links connecting said arms with the vehicle axles.

7. In a vehicle, a frame comprising a tubular skeleton structure with two longitudinal elements, sleeves arranged within the longitudinal elements near the central portion thereof, said sleeves having exterior grooves and interior ribs extending axially thereof, collars surrounding the tubes in the plane of the sleeves and interiorly ribbed to press the tube into engagement with all the exterior grooves of the sleeve, torsion spring rods having ribbed ends arranged within the longitudinal tubes in engagement with the grooves in the interior of the sleeves, arms on the free ends of the rods, and a connection between said arms and the vehicle axles.

8. In a vehicle, a frame comprising a tubular skeleton structure, a torsion spring rod arranged axially within certain of the tubes and secured at one portion thereto, an arm carried by the free end of the rod, means to adjust the relation of the arm to the rod and a connection between said arm and the vehicle axle.

9. In a vehicle, a frame comprising a tubular structure with two longitudinal elements, torsion springs rods arranged within the longitudinal tubes, a fixed connection between one end of the rods and the tube, the outer end of the rods provided with a transverse groove having a radial face, arms mounted on the outer ends of the rods in the plane of the groove, a key arranged in the arm and abutting against the radial face of the groove, and means to adjust the key, and a connection between the arms and the vehicle axles.

10. In a vehicle, a frame comprising a tubular structure with two longitudinal elements, torsion spring rods arranged within the longitudinal tubes, a fixed connection between one end of the rods and the tube, the outer end of the rods provided with a transverse groove having a radial face, arms mounted on the outer ends of the rods in the plane of the groove, a key arranged in the arm and abutting against the radial face of the groove, a set screw threaded into the hub of the arm and bearing against the key to adjust the position of the arm relative to the rod, and a connection between the arms and the vehicle axles.

11. In a vehicle frame, two longitudinal tubes, torsion spring-bars arranged in the hollow space of said tubes, means to secure said bars to the center of the tubes, bearings provided at the mouth of the tubes supporting rotatably near to the free ends said bars, swinging arms provided on the free ends of the spring rods and links for connecting the free ends of the swinging arms to the carriage axles.

12. In a vehicle, a frame comprising a tubular structure with two longitudinal elements, torsion spring rods arranged within the longitudinal tubes, an unround telescopic connection between the inner ends of the rods and the tubes, the outer ends of the rods journaled to fit bearings formed in the outer ends of the tubes and provided with an enlargement adjacent to said bearing, arms mounted on said enlargement, means to adjust the position of the arms on the rods, and a link connection between the arms and the vehicle axles.

13. In a vehicle, a tubular skeleton frame comprising two longitudinal elements and transverse elements with joint pieces connecting said elements, torsion spring rods arranged within the longitudinal tubes and secured at one end thereto, the outer ends of the rods journaled within the joint pieces, caps threaded into the joint pieces and inclosing the outer extremities of the rods, an enlargement on the rod adjacent to the bearings and provided with the transverse groove having a radial face, an arm mounted on the enlargement of the rod, a key adjustably mounted in the hub of the arm and abutting against the radial face of the groove, and a link connection between the arms and the vehicle axles.

14. In a vehicle, a frame, a torsion spring member mounted thereon and secured at both extremities against lateral movement and at one position in fixed relation thereto, and an eccentric connection between the free end of the torsion member and the vehicle axle.

In testimony whereof I affix my signature to this specification, in the presence of two witnesses.

COLOMAN DE KANDO.

Witnesses:
EUGENE HARRANYE,
F. E. MALLETT.